March 1, 1927.　　　　R. STEWART　　　　1,619,770
DISPENSING CONTAINER
Filed March 19, 1926
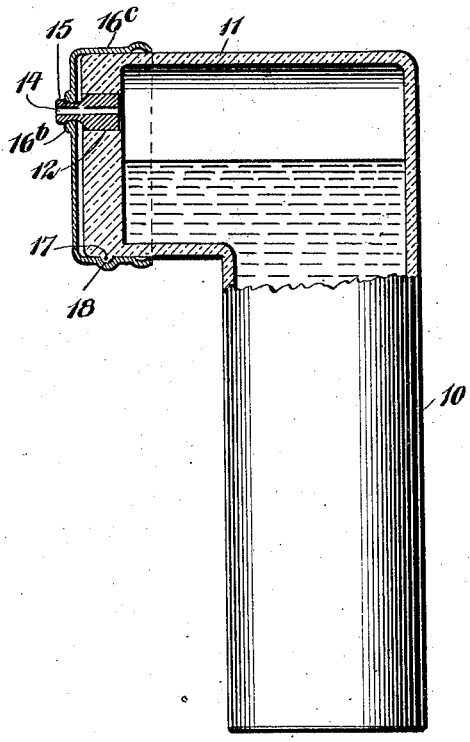
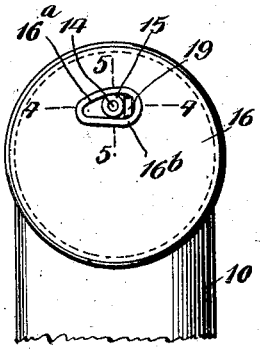
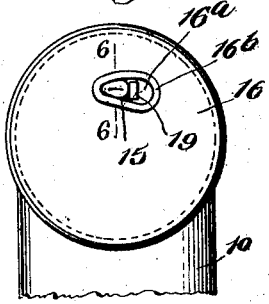
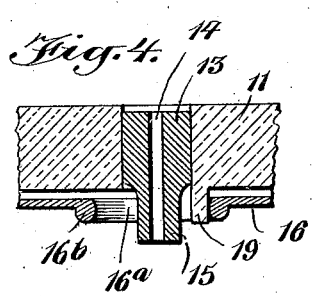
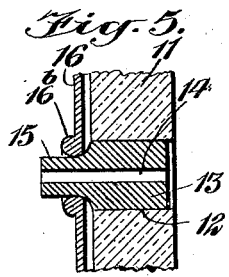
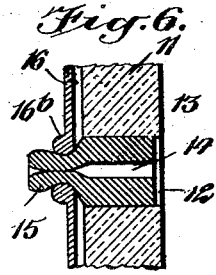
WITNESSES
INVENTOR
Robert Stewart
BY
ATTORNEYS Patented Mar. 1, 1927.

1,619,770

UNITED STATES PATENT OFFICE.

ROBERT STEWART, OF NEW YORK, N. Y.

DISPENSING CONTAINER.

Application filed March 19, 1926. Serial No. 96,006.

The present invention is concerned with the provision of a container for liquids. While the device may have a wide range of utility in the arts, it is primarily adapted for the reception of somewhat oily or viscous liquids which are dispensed with difficulty from an ordinary bottle.

More specifically the invention is concerned with the provision of a dispensing container for hair oils, shoe oils or the like, which is so designed that the contents of a container may be conveniently dispensed without soiling the outside of the container, and without the danger of dispensing too much liquid at one time.

An object of the invention is to provide a container of this character of simple, practical construction, which will be durable and efficient in use, convenient to manipulate, and which will lend itself to economical manufacture.

A more specific object of the invention is the provision of a novel type of dispensing outlet which may be selectively opened or closed by movement of the container cap.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view partly in side elevation and partly in vertical section through a container embodying the present invention.

Fig. 2 is a fragmentary view taken at right angles of Fig. 1.

Fig. 3 is a view similar to Fig. 2, but showing the container cap rotated to close the discharge orifice.

Fig. 4 is an enlarged sectional detail on the line 4—4 of Fig. 2.

Fig. 5 is a similar view on the line 5—5 of Fig. 2.

Fig. 6 is an enlarged sectional detail on the line 6—6 of Fig. 3.

While certain features of the invention may be embodied in containers of various shapes and styles, I prefer to use a container in the nature of a bottle of general L-shape including a longer arm 10 and a shorter arm 11 communicating freely with each other, and co-operatively defining a storage space for liquid. In the end face of the shorter arm 11 there is provided a filling opening 12 through which liquid may be introduced into the bottle. This opening receives a closure element 13 formed with a central passageway 14 therethrough, from which liquid may be selectively dispensed. Closure element 13 is preferably formed of compressible rubber including a relatively large portion snugly fitting the opening 12, and a reduced portion 15 extending beyond the end face of the arm 11 and projecting through a cam slot 16ª in a cap 16.

The cap 16 is mounted for limited rotational movement on the end of the arm 11, this arm preferably being formed with an arcuate bead 17 receiving a groove 18 in the cap flange 16ᶜ which embraces the arm 11.

The cam slot 16ª as illustrated is of general pear shape, and when the cap 16 is rotated, the walls of the narrower ends of the slot will effectively compress the reduced tubular portion of the closure element 13 and close the passage 14 as seen in Figs. 3 and 6. When the cap is rotated to its other extreme position, the tube 15 will be free to expand between the walls of the cam slot, and will present a free passageway 14 through which the contents of the container may be dispensed.

The cam slot 16ª preferably is formed with beaded edges 16ᵇ, or is otherwise suitably constructed to avoid tearing or cutting of the neck 15 of the rubber closure element. Movement of the cap 16 in a counter clockwise direction is limited by the engagement of the walls of the slot 16ª with a stop lug 19 integral with the end of the arm 11.

The preferred method of using the container is to grasp the longer arm 10 thereof and use the same as a handle, and by shaking to effect the dispensing of small quantities of liquid through the passage 14.

While I have not illustrated it in the drawings, it may prove desirable in many instances to use the cap 16 not only as a controlling device for the dispensing tube, but as an applicator. In this instance the cap might be covered with lamb's wool or the like for polishing shoes, or with a series of rubber massaging tits when applying hair oil, so that the oil might be thoroughly rubbed in. It will of course be understood that while I have shown the compressible neck 15 of the rubber closure element controlled by a cam slot in the cap 16, various other expedients might be resorted to for effectively compressing and closing the neck 15.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A container for liquids including a shiftable cap having an outlet opening therein, a compressible tube in the outlet opening, and means operable upon movement of the cap for pinching the tube to close the outlet.

2. A container for liquids having an outlet opening therein, a compressible tube in the outlet opening, and means for pinching the tube to close the outlet including a shiftable member having a cam slot therein, the walls of which are engageable with the tube to compress the same.

3. A container for liquids having an outlet opening therein, a compressible tube in the outlet opening, and means for pinching the tube to close the outlet including a cap partially rotatable on the end of the container and having a cam slot therein receiving the end of the tube.

4. A dispensing container having an outlet opening therein, a hollow rubber plug including a large end fitting the opening and a reduced projecting readily compressible tubular end adapted to be pinched to close the outlet, and means associated with the container for mechanically pinching said end.

5. An approximately L-shaped container having an outlet opening in one end thereof, a rubber tube fitted in the outlet opening, a cap on the end of the container having a cam slot therein receiving the end of the tube whereby the tube may be pinched by the slot as the cap is turned in one direction.

6. An approximately L-shaped container having an outlet opening in one end thereof, a rubber tube fitted in the outlet opening, a cap on the end of the container having a cam slot therein receiving the end of the tube whereby the tube may be pinched by the slot as the cap is turned in one direction, and a stop lug on the container projecting into the container to limit the turning movement of the cap in the other direction.

ROBERT STEWART.